(12) United States Patent
Johnson

(10) Patent No.: US 10,006,334 B2
(45) Date of Patent: Jun. 26, 2018

(54) HYDRAULIC DRIVEN FAN SYSTEM

(71) Applicant: Caterpillar Inc., Peoria, IL (US)

(72) Inventor: Steven Edward Johnson, Crest Hill, IL (US)

(73) Assignee: Caterpillar Inc., Deerfield, IL (US)

( * ) Notice: Subject to any disclaimer, the term of this patent is extended or adjusted under 35 U.S.C. 154(b) by 257 days.

(21) Appl. No.: 15/143,208

(22) Filed: Apr. 29, 2016

(65) Prior Publication Data

US 2016/0245149 A1     Aug. 25, 2016

(51) Int. Cl.
| | | |
|---|---|---|
| *F15B 11/042* | (2006.01) | |
| *F01P 7/04* | (2006.01) | |
| *F01P 5/04* | (2006.01) | |
| *F16H 61/452* | (2010.01) | |
| *F01P 5/02* | (2006.01) | |

(52) U.S. Cl.
CPC .............. *F01P 7/044* (2013.01); *F01P 5/04* (2013.01); *F15B 11/0423* (2013.01); *F01P 2005/025* (2013.01); *F15B 11/042* (2013.01); *F16H 61/452* (2013.01)

(58) Field of Classification Search
CPC .......... F01P 7/044; F01P 5/04; F15B 2211/62; F15B 21/042; F15B 21/0423
USPC .......................................................... 60/424
See application file for complete search history.

(56) References Cited

U.S. PATENT DOCUMENTS

| | | |
|---|---|---|
| 4,271,914 A | 6/1981 | Dressel |
| RE33,835 E * | 3/1992 | Kime ...................... F04C 14/24 |
| | | 180/53.4 |
| 8,398,004 B2 | 3/2013 | Harms |
| 8,579,595 B2 | 11/2013 | Cho |
| 2014/0018964 A1* | 1/2014 | Turnis ..................... F01P 7/044 |
| | | 700/282 |
| 2014/0373523 A1 | 12/2014 | Brown et al. |

FOREIGN PATENT DOCUMENTS

EP            2927371        10/2015

* cited by examiner

*Primary Examiner* — F. Daniel Lopez
*Assistant Examiner* — Daniel Collins
(74) *Attorney, Agent, or Firm* — Edward Y. Lin

(57) ABSTRACT

A hydraulic driven fan system includes at least one first fan motor and a second fan motor connected in series with each other. The system also includes a fixed displacement pump configured to supply a pressurized flow of a hydraulic fluid to the at least one first and second fan motors. The system includes a proportional flow control valve in fluid communication with the at least one first fan motor and configured to allow a regulated amount of the pressurized flow of the hydraulic fluid there through to the corresponding at least one first fan motor. The system includes a pressure compensator disposed parallel to the proportional flow control valve and configured to maintain a pressure difference across the proportional flow control valve. The system further includes a proportional pressure relief valve disposed parallel to the second fan motor and configured to control a pressure difference across the second fan motor.

1 Claim, 1 Drawing Sheet

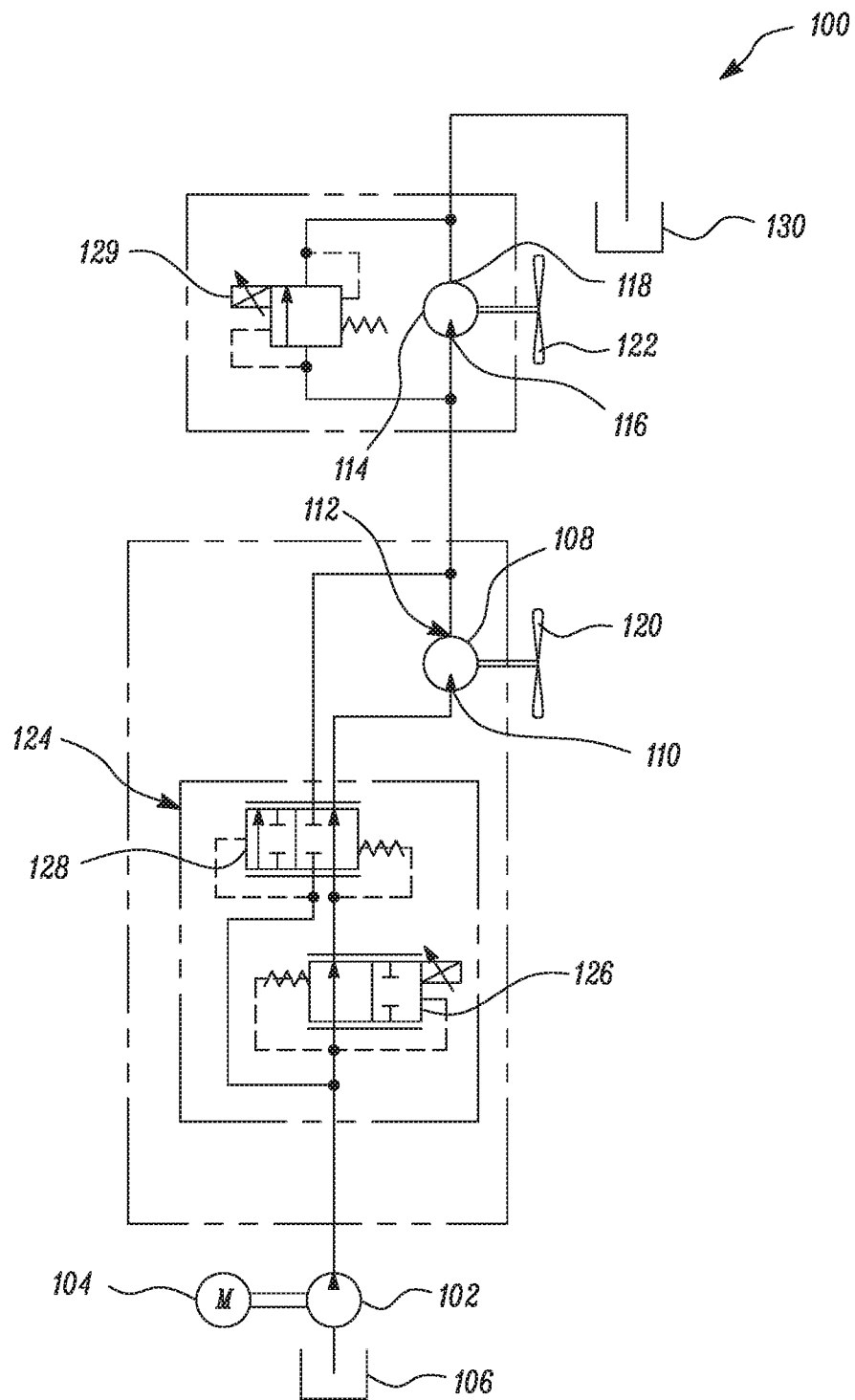

HYDRAULIC DRIVEN FAN SYSTEM

TECHNICAL FIELD

The present disclosure relates to a hydraulic driven fan system. More particularly, the present disclosure relates to a system for controlling the hydraulic driven fan.

BACKGROUND

Machines such as, loaders, excavators, dozers, motor graders, and other types of engine-driven machines include a fan system for cooling an engine and other components associated with the machines. The fan system includes multiple fan motors which moves air across a heat exchanger of the machine in order to cool a coolant which in turn, cools the engine and other components. In some arrangements, a hydraulic pump is connected with each of the fan motors to drive the fan motors, independently. This may increase a cost and design complexity of the fan cooling system. Further, in other arrangements, the fan motors are connected in series and driven by a single hydraulic pump.

Furthermore, a pressure valve is also fluidly coupled with each of the fan motors in order to maintain a pressure within the fan cooling system. However, in such arrangements, a back pressure is created across an upstream fan motor during operation of the fan cooling system. This may cause damage to the pressure valves and may cause inefficient operation of the fan system.

U.S. Published Application Number 2014/0373523 (hereinafter referred to as '523 patent application) discloses a hydraulic fan drive with multiple hydraulic motors in series. The hydraulic fan drive includes two fixed displacement hydraulic motors arranged in series supplied with a pressure medium in an open hydraulic circuit by a fixed displacement pump. The hydraulic fan drive also includes a flow control valve, via which a pressure medium volume flows from a line segment between the two hydraulic motors to a pressure sink. The flow control valve is integrated into a housing of the upstream hydraulic motor.

However, use of a common pressure control valve may have a limit to the amount of allowable back pressure before damaging the valve. In addition, the machine may not have the space claim to have two separate fan systems driven by two separate pumps. Thus, there is a need for an improved system for controlling hydraulic driven fans connected in series.

SUMMARY OF THE DISCLOSURE

In an aspect of the present disclosure, a hydraulic driven fan system is provided. The system includes at least one first fan motor and a second fan motor connected in series. The system also includes a fixed displacement pump configured to supply a pressurized flow of a hydraulic fluid to each of the at least one first fan motor and the second fan motor. The system also includes a pressure compensating unit for each of the at least one first fan motor. The pressure compensating unit includes a proportional flow control valve in fluid communication with the at least one first fan motor. The proportional flow control valve is configured to allow a regulated amount of the pressurized flow of the hydraulic fluid through to the corresponding at least one first fan motor. The pressure compensating unit also includes a pressure compensator disposed parallel to the proportional flow control valve. The pressure compensator is configured to maintain a pressure difference across the proportional flow control valve. The system further includes a proportional pressure relief valve disposed parallel to the second fan motor. The proportional pressure relief valve is configured to control a pressure difference across the second fan motor.

Other features and aspects of this disclosure will be apparent from the following description and the accompanying drawings.

BRIEF DESCRIPTION OF THE DRAWINGS

FIG. 1 shows a hydraulic circuit for a fan system having multiple hydraulic driven fans connected in series, in accordance with an embodiment of the disclosure.

DETAILED DESCRIPTION

Wherever possible, the same reference numbers will be used throughout the drawings to refer to the same or the like parts. FIG. 1 illustrates a hydraulic fan system 100 (hereinafter referred to as 'the system 100'), in accordance with an embodiment of the present disclosure.

The system 100 may be used to circulate air over components of a machine such as, an engine, one or more heat exchangers, such as a radiator, an oil cooler, etc. Many types of machines that use an engine for motive power also include a radiator to supply a coolant, such as water, anti-freeze, or the like, to the engine to ensure that the engine does not overheat. The radiator may be generally associated with the fan system 100 that supplies cooling air to the radiator.

The concepts of the present disclosure may be suitably applicable to a wide variety of machines that include cooling fans. Although the present disclosure is illustrated with regard to a mobile machine, the present disclosure also finds potential application to stationary systems, such as generator sets and the like. In addition, although the present disclosure is illustrated in the context of a cooling fan for a variety of coolers (e.g., hydraulic oil, transmission oil, intake air, radiator, etc.) associated with an engine and other machine systems, the present disclosure could find potential application to other cooling fan applications where a hydraulically motored fan is used to circulate air past some machine component and/or heat exchanger needing cooling air.

Referring to FIG. 1, a hydraulic fan system 100 is illustrated. The hydraulic fan system 100 includes a fixed displacement pump 102 (also referred to as 'the pump 102'). The pump 102 may be driven by a pump motor 104. The pump 102 may be configured to supply a pressurized fluid to connected components. The pump 102 may be supplied with a low pressure hydraulic fluid from a tank 106.

The hydraulic fan system 100 also includes at least one first fan motor 108 and a second fan motor 114 connected in series with each other. In the illustrated embodiment, the hydraulic fan system 100 includes one first fan motor 108 having an inlet 110 and an outlet 112. The second fan motor 114 also has an inlet 116 and an outlet 118. The inlet 116 of the second fan motor 114 is in fluid communication with the outlet 112 of the first fan motor 108. The outlet 118 of the second fan motor 114 may be in fluid communication with a discharge tank 130, in the illustrated embodiment.

In other embodiments, the hydraulic fan system 100 may include more than one first fan motor 108 connected in series with each other and with the second fan motor 114. The first fan motor 108 and the second fan motor 114 are configured to drive a first fan 120 and a second fan 122 respectively.

For example, a radiator may be generally provided to cool a coolant, such as water, anti-freeze, or the like, for an engine (not shown) or another device of a machine (not shown) that needs to be cooled during operation. In an example, the fans may be disposed in an air passage such that the flow of air from the fans 120, 122 passes over the radiator when the fan is driven at a certain speed. The speed of the fans 120, 122 may depend on a fluid flow across the corresponding motors driving the fans 120, 122.

As shown, the first fan motor 108 may be located downstream of the fixed displacement pump 102. Further, the second fan motor 114 may be located downstream of the first fan motor 108. The fixed displacement pump 102 is configured to supply a pressurized fluid to each of the first fan motor 108 and the second fan motor 114. In the illustrated embodiment, the first fan motor 108 may be configured to receive the pressurized fluid from the pump 102. Further, the second fan motor 114 may be in fluid communication with the first fan motor 108 to receive the fluid therefrom.

The first fan 120 and the second fan 122 may be positioned so as to cool the corresponding component at the same time. The flow control valve 126 and proportional pressure relief valve 129 may receive a signal to increase or decrease the speed of rotation of the first fan 120 and the second fan 122. Accordingly, the pump 102 may supply the pressurized fluid to each of the first fan motor 108 and the second fan motor 114. In an embodiment, the output requirement may be equally shared between the first fan 120 and the second fan 122.

The system 100 also includes a pressure compensating unit 124. The pressure compensating unit 124 includes a proportional flow control valve 126 disposed in fluid communication with the first fan motor 108. In the illustrated embodiment, the flow control valve 126 is also in fluid communication with the fixed displacement pump 102. As shown, the flow control valve 126 may be in a normally open position and configured to allow a flow of the hydraulic fluid there through. Moreover, based on a pressure requirement at the first fan motor 108, the flow control valve may allow the flow of the hydraulic fluid.

The pressure compensating unit 124 also includes a pressure compensator 128 which is parallel to the flow control valve 126. The pressure compensator 128 may include a spring and a control piston which is acted upon by the spring. The piston may be configured to move towards a closing direction or an open direction based on a pressure at an inlet and an outlet of the flow control valve 126 by the spring. Moreover, the position of the piston is adjusted to maintain a particular pressure drop across the flow control valve 126. As such, a constant flow rate through the first fan motor 108 may be achieved.

The system 100 also includes a proportional pressure relief valve 129. The pressure relief valve 129 is in fluid communication with the first fan motor 108 and configured to receive at least a portion of the hydraulic fluid therefrom. Further, the pressure relief valve 129 may be connected in parallel to the second fan motor 114. As such, the pressure relief valve 129 may control a pressure drop across the second fan motor 114.

The pressurized fluid to various components of the system 100 may be supplied through hoses leading through appropriate passages. The flow control valve 126 and/or the pressure relief valve 129 may be electronically actuated, for example, solenoid actuated.

The system 100 may also include a controller (not shown). The controller may be communicably coupled to the flow control valve 126 and the pressure relief valve 129. The controller may include a microprocessor, an application specific integrated circuit ("ASIC"), or other appropriate circuitry and may have memory or other data storage capabilities. The controller may include functions, steps, routines, data tables, data maps, charts and the like saved in and executable from read only memory to control various components of the system 100.

In one embodiment, the controller may be a single, discrete unit, and in other embodiments, the controller and its functions may be distributed among multiple distinct and separate components. The controller may be configured to execute instructions and provide one or more outputs to the flow control valve 126 and the pressure relief valve 129. Further, in addition to the components illustrated in FIG. 1, the controller may be operatively associated with various other components of the machine. For example, the controller may receive an output requirement at the components that are to be cooled by the system 100. Accordingly, the controller may adjust a position of the corresponding flow control valve 126, the pressure relief valve 129 etc.

Communication between the controller and the other electronic components such as the flow control valve 126 and the pressure relief valve 129 may be established by sending and receiving digital or analog signals across electronic communication lines or communication busses, including by wireless communication.

In one case, the first fan motor 108 may need to operate at a low speed and the second fan motor 114 at a high speed. The controller may operate the flow control valve 126 to allow a less fluid to pass there through. As such, the first fan motor 108 receives a less fluid from the pump 102 via the flow control valve 126. As such, the first fan motor 108 has a low pressure thereby rotating the first fan 120 at a low speed.

Further, a remaining flow of fluid i.e., a majority of fluid is bypassed and sent through the pressure compensator 128. The pressure compensator 128 references the pressures at the inlet and the outlet of the flow control valve 126. Further, the pressure compensator 128 adjusts its position to maintain a particular pressure drop across the flow control valve 126.

The combined flow from the first fan motor 108 and the pressure compensator 128 flows towards the second fan motor 114 and the pressure relief valve 129. The controller may regulate a position of the relief valve 129 to allow a less portion of the fluid there through. As such, majority of the flow is directed towards the second fan motor 114 to achieve a high pressure thereof. Further, the second fan motor 114 may rotate the second fan 122 at a high speed. Moreover, the controller may control a pressure drop across the second fan motor 114 by adjusting the position of the pressure relief valve 129.

In another case, the first fan motor 108 may need to be operated at a high speed and the second fan motor 114 at a low speed. The controller may operate the flow control valve 126 to allow a majority of the fluid to pass there through. The remaining fluid may be bypassed through the pressure compensator 128. The first fan motor 108 receives more fluid from the pump 102 via the flow control valve 126. As such, the first fan motor 108 has a high pressure thereby rotating the first fan 120 at a high speed.

The pressure compensator 128 references the pressures at the inlet and the outlet of the flow control valve 126. Further, the pressure compensator 128 adjusts its position to maintain a particular pressure drop across the flow control valve 126 thereby attaining a constant flow rate across the first fan motor 108.

The combined flow from the first fan motor 108 and the pressure compensator 128 flows towards the second fan motor 114 and the pressure relief valve 129. The controller may regulate a position of the pressure relief valve 129 to allow a majority of the fluid there through. As such, less flow is directed towards the second fan motor 114 to achieve a low pressure thereof thereby rotating the second fan 122 at a low speed. Moreover, the controller may control a pressure drop across the second fan motor 114 by adjusting the position of the pressure relief valve 129.

INDUSTRIAL APPLICABILITY

The present disclosure is related to various embodiments of the hydraulic fan systems. More specifically, the system 100 includes multiple fan motors connected in series with each other. The fan motors in series generally lead to high pressure at the outlet 112 and inlet 110 of the upstream motor i.e., the first fan motor 108. With implementation of the present system 100, the back pressures can be effectively handled thereby allowing usage of the fan motors in series.

Additionally, the system 100 may include any number of first fan motors 108 connected in series. Accordingly, each of the first fan motors 108 may be associated with the flow control valve 126 and the pressure compensator 128.

The system 100 of the present disclosure includes the flow control valve 126 that is pressure compensated by the pressure compensator 128. The pressurized fluid flows from the pump 102 to the first fan motor 108 via the flow control valve 126. During such condition, the pressure compensator 128 adjusts its position to maintain a particular pressure difference across the flow control valve 126. Therefore, flow rate across the first fan motor 108 may be constant.

Similarly, to avoid damage of the second fan motor 114, if the fluid pressure becomes too great, the system 100 includes the pressure relief valve 129. Accordingly, at least a portion of the flow may be bypassed around the second fan motor 114 and passes through the pressure relief valve 129 to the discharge tank 130. Moreover, the controller of the present system 100 is configured to operate at any of the low pressure condition and the high pressure condition of the first fan motor 108 and the second fan motor 114.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A hydraulic driven fan system comprising:
   at least one first fan motor;
   a second fan motor connected in series with the at least one first fan motor;
   a fixed displacement pump configured to supply a pressurized flow of a hydraulic fluid to each of the at least one first fan motor and the second fan motor;
   a pressure compensating unit for each of the at least one first fan motor, the pressure compensating unit including:
      a proportional flow control valve in fluid communication with the at least one first fan motor, the proportional flow control valve configured to allow a regulated amount of the pressurized flow of the hydraulic fluid there through to the corresponding at least one first fan motor; and
      a pressure compensator disposed parallel to the proportional flow control valve, the pressure compensator configured to maintain a pressure difference across the proportional flow control valve; and
   a proportional pressure relief valve disposed parallel to the second fan motor, the proportional pressure relief valve configured to control a pressure difference across the second fan motor.

* * * * *